July 23, 1929.  M. MANTOUT  1,722,151
STEERING WHEEL DEVICE FOR AUTOMOBILE VEHICLES
Filed May 15, 1928
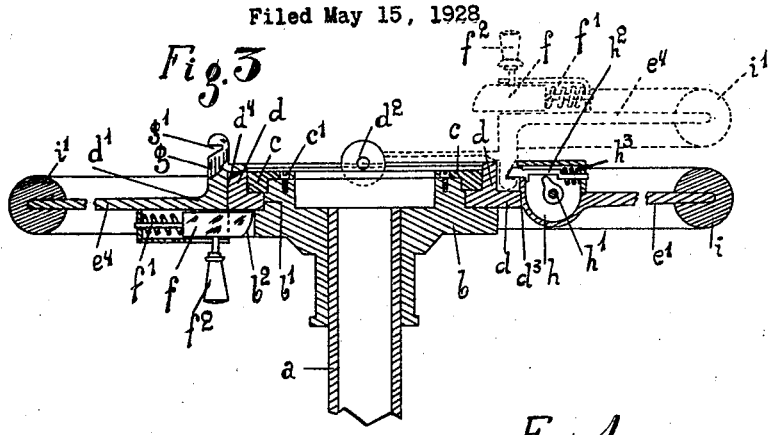
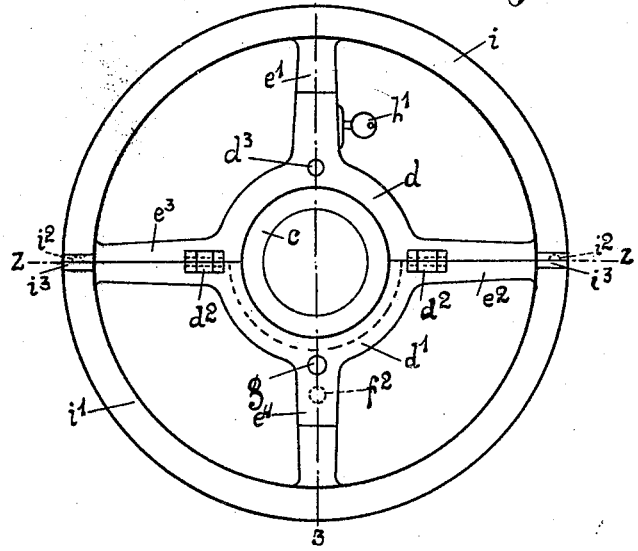
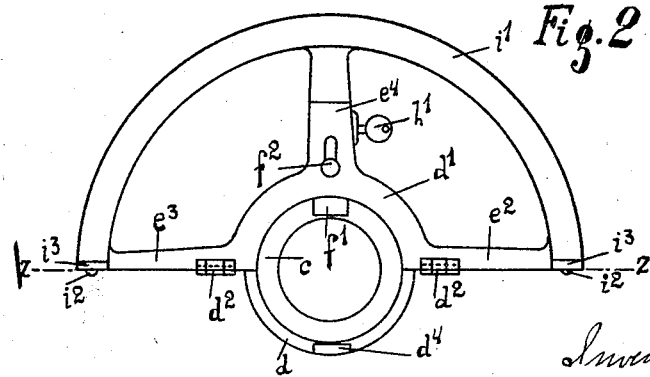

Patented July 23, 1929.

1,722,151

UNITED STATES PATENT OFFICE.

MAURICE MANTOUT, OF PARIS, FRANCE.

STEERING-WHEEL DEVICE FOR AUTOMOBILE VEHICLES.

Application filed May 15, 1928, Serial No. 277,934, and in France June 20, 1927.

The present invention relates to a steering wheel device for automobiles, characterized by the fact that it can be folded up, preferably diametrically, and by the fact that in its folded position it is loose on the steering column, so that it can then be freely turned without moving the steering column and be thus brought, without changing the setting of the front wheels, into the position which allows the driver to get in or out of the car in the easiest way and gives him the easiest access to his seat. Further, in its folded position, the pivoting part of the steering wheel is locked on to the fixed portion by means of a safety lock which protects the owner against theft, or the unauthorized use of his car, as it is necessary to have the key in order to fold back the steering wheel into its original position and to bring it back into one piece with the steering column.

In the actual preferred form of this invention, the sleeve fixed on the steering column forming the hub of the steering wheel has on its periphery a notch in which, when the pivoting portion is lowered on the fixed portion of the steering wheel, a spring bolt led towards this notch enters it and becomes engaged thereby.

This pivoting portion of the steering wheel comprises a part which in the folded position of the steering wheel forms a catch for the safety locking bolt mounted on the fixed part of the steering wheel.

The accompanying drawing represents this embodiment of the invention by way of example only.

Fig. 1 is a diagrammatic plan view of the steering wheel according to the invention in its unfolded position.

Fig. 2 is a corresponding view in the folded position.

Fig. 3 is a section, on a larger scale, on the line 3—3 of Fig. 1.

In the drawings, $a$ represents the steering tube or rod upon which the sleeve $b$, forming the hub of the steering wheel, is fixed in any suitable manner; on this hub there is fixed—for example, by means of a screw $c^1$—a cap $c$ which may carry the necessary gear other than the steering gear such as ignition timing device, acoustic device or the like. A ring, integral with the spokes of the steering wheel, is movable, in a groove or circular slideway $b^1$ formed between the periphery of the hub $b$ and the cap $c$, in a plane perpendicular to the steering tube; this ring comprises a part $d$ and another part $d^1$ which can pivot through 180° in relation to the former part about the joint axis $z$—$z$ (Fig. 1), formed diametrically of the steering wheel by the hinges $d^2$; the part $d$ of the ring comprises a whole spoke $e^1$ and half of the two spokes $e^2$ and $e^3$; the other half of these spokes $e^2$ and $e^3$ is integral with the pivoting part $d^1$ of the ring, as well as the fourth spoke $e^4$. On this pivoting part $d^1$ of the ring there is mounted, below the spoke $e^4$ (Fig. 3), a bolt $f$ adapted to be brought into engagement under the action of its spring $f^1$ with a corresponding notch $b^2$ formed in the periphery of the hub $b$; the bolt $f^1$ can be disengaged from this notch by hand or by means of a button $f^2$.

The pivoting part $d^1$ of the ring also has a projection in the form of a finger $g$ with a notch or recess $g^1$. The fixed part $d$ of the ring has, in correspondence with the finger $g$ of the part $d^1$, a safety lock $h$, the key of which $h^1$ acts on the bolt $h^2$, which a spring $h^3$ constantly tends to bring back into its locking position. The hand wheel of the steering wheel is likewise in two parts $i$, $i^1$ jointed and adapted to be lowered upon the other about the axis $z$—$z$ (Fig. 1); studs $i^2$, integral with the pivoting part $i^1$, are adapted to engage in corresponding holes of the fixed part $i$, with the interposition of thrust washers $i^3$, thus preventing the separation of the two parts $i$, $i^1$ of the hand wheel by vibration.

In the operative position of the steering wheel, the pivoting part $d^1$ of the ring is turned down about the axis $z$—$z$ and the bolt $f$ engages in the notch $b^2$ of the hub $b$, thus making the steering wheel integral with the steering tube $a$. The bolt $f$ plays a double part: it moves the steering rod and keeps the steering wheel open so that it cannot fold.

When the driver wishes to leave or resume his seat, it is sufficient for him, by acting upon the button $f^2$, to disengage the bolt $f$ from its seat $b^2$, then to raise the pivoting part $d^1$ of the ring, to turn it through 180° about the hinges $d^2$ (forming the joint axis $z$—$z$) and to fold it upon the fixed part $d$ of the ring; the finger $g$ of the pivoting part $d^1$ engages in a corresponding hole $d^3$ formed in the fixed part $d$; in this position the notch $g^1$ of this finger $g$ forms a catch for the bolt $h^2$ of the safety lock $h$, which thus renders the pivoting part $d^1$ immovable in relation to the fixed part $d$. The steering wheel proper can then turn freely on the hub $b$—i. e., in relation to the steering tube $a$—with which it is no longer integral; the driver can thus bring the steering wheel so folded up diametrically (and consequently occupy less space) into the angular position which is most suitable for enabling him to resume or leave his seat, without turning the steering tube in this angular movement of the steering wheel—i. e., without in any way changing the setting of the steering gear.

Moreover, it is sufficient for him to withdraw the key $h^1$ from the safety lock $h$ in order to prevent theft or any unauthorized use of the car, because in the absence of this key it is impossible to separate the two halves of the steering wheel folded one upon the other and to make the steering wheel again integral with the steering gear.

In order to carry out this operation, the driver disengages the bolt $h^2$ of the safety lock from the notch $g^1$ of the finger $g$ by means of the key $h^1$; he can then turn the pivoting part $d^1$ back from the fixed part $d$ of the ring of the steering wheel into its normal position; by turning this ring in the circular slideway $b^1$ it is led, in relation to the hub $b$, into an angular position in which the bolt $f$ becomes automatically engaged, under the action of the spring $f^1$, in the catch formed by the notch $b^2$ of the hub $b$ of the steering tube. The fixed part $d$ of the ring may have in its upper surface, in the same vertical plane as the notch $b^2$ of the hub $b$, an inclined slightly bevelled face $d^4$ in order that, during the turning back of the pivoting part $d^1$, the bolt $f$ may, on encountering this inclined face $d^4$, be gently pushed back outwardly with compression of its restoring spring $f^1$ so as not to prevent the complete turning back of the steering wheel.

There may also be provided some suitable safety device adapted to fix the bolt $f$ in its locking position, for the purpose of preventing this bolt from coming out of the notch $b^2$ as the result of some accidental cause or wrong operation.

What I claim is:

1. A steering wheel device for automobile vehicles, comprising a steering column, a steering wheel proper rotatably mounted thereupon and consisting of two complementary parts, one of which is hingedly connected to the other and is adapted to be folded up over the latter fixed part, and means, carried by said foldable part of the steering wheel, adapted to automatically lock the steering wheel proper to the steering column when in the unfolded or extended position, and adapted to unlock the steering wheel proper from the steering column when in the folded up position, for the purpose described.

2. In a steering wheel device as claimed in claim 1, the provision, upon the fixed part of the steering wheel proper, of means for automatically locking the foldable part, when in its folded up position, to said fixed part of the steering wheel proper, for the purpose described.

3. A steering wheel device for automobile vehicles, comprising a steering column, a sleeve member secured thereto, a steering wheel proper rotatably mounted upon said sleeve member and comprising a fixed part and a part hingedly connected to the fixed part of the same and adapted to be folded up over the fixed part, a notch in the periphery of said sleeve member, and a spring bolt, carried by the foldable part of the steering wheel proper and adapted to automatically enter into said notch when the said foldable part is pivoted into its extended or unfolded position and thus lock the steering wheel proper to the steering column.

4. In a steering wheel device as claimed in claim 1, the provision of a catch upon the folded portion of the steering wheel proper and of a safety locking bolt mounted upon the fixed portion of the steering wheel proper and adapted to automatically engage into said catch when the foldable part of the steering wheel is folded up over the fixed part of the same, for the purpose described.

In testimony whereof I have signed my name to this specification.

MAURICE MANTOUT.